United States Patent
Omiya et al.

(10) Patent No.: US 12,309,832 B2
(45) Date of Patent: May 20, 2025

(54) WIRELESS COMMUNICATION DEVICE AND WIRELESS COMMUNICATION CONTROL METHOD

(71) Applicant: NIPPON TELEGRAPH AND TELEPHONE CORPORATION, Tokyo (JP)

(72) Inventors: Riku Omiya, Musashino (JP); Yasushi Takatori, Musashino (JP); Takafumi Hayashi, Musashino (JP); Koichi Ishihara, Musashino (JP); Tomoki Murakami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 359 days.

(21) Appl. No.: 17/424,457

(22) PCT Filed: Jan. 14, 2020

(86) PCT No.: PCT/JP2020/000815
§ 371 (c)(1),
(2) Date: Jul. 20, 2021

(87) PCT Pub. No.: WO2020/153166
PCT Pub. Date: Jul. 30, 2020

(65) Prior Publication Data
US 2022/0116992 A1    Apr. 14, 2022

(30) Foreign Application Priority Data
Jan. 23, 2019    (JP) ................................ 2019-009465

(51) Int. Cl.
*H04W 74/0808* (2024.01)
*H04W 72/0453* (2023.01)
*H04W 84/12* (2009.01)

(52) U.S. Cl.
CPC ... *H04W 74/0808* (2013.01); *H04W 72/0453* (2013.01); *H04W 84/12* (2013.01)

(58) Field of Classification Search
None
See application file for complete search history.

(56) References Cited

U.S. PATENT DOCUMENTS

2005/0277411 A1* 12/2005 Utsunomiya ......... H04W 24/00
                                                            455/434
2006/0135191 A1    6/2006   Matsui et al.
(Continued)

FOREIGN PATENT DOCUMENTS

| JP | S60137143 A | 7/1985 |
| JP | S60165132 A | 8/1985 |

(Continued)

OTHER PUBLICATIONS

IEEE Std 802.11ac-2016, Dec. 2016.
(Continued)

*Primary Examiner* — Suhail Khan
(74) *Attorney, Agent, or Firm* — Harness, Dickey & Pierce, P.L.C.

(57) ABSTRACT

A wireless communication device that detects a vacant channel by carrier sensing from among a plurality of channels and performs communication using the vacant channel includes a carrier sensing unit configured to divide channels to be carrier sensed between a wireless station and a surrounding wireless station, acquire a result of carrier sensing from the surrounding wireless station, and share results of carrier sensing from the wireless station and the surrounding wireless station to detect the vacant channel.

8 Claims, 9 Drawing Sheets

(56) References Cited

U.S. PATENT DOCUMENTS

| | | | |
|---|---|---|---|
| 2009/0305734 A1* | 12/2009 | Toshimitsu | H04W 74/02 455/509 |
| 2011/0044257 A1 | 2/2011 | Utsunomiya et al. | |
| 2011/0261782 A1* | 10/2011 | Nakano | H04W 72/541 370/329 |
| 2015/0009906 A1* | 1/2015 | Dore | H04L 5/0007 370/329 |
| 2016/0374057 A1* | 12/2016 | Takano | H04W 16/14 |
| 2020/0053711 A1 | 2/2020 | Matsuda et al. | |

FOREIGN PATENT DOCUMENTS

| | | |
|---|---|---|
| JP | H08223632 A | 8/1996 |
| JP | 2003273792 A | 9/2003 |
| JP | 2006197559 A | 7/2006 |
| JP | 2009212968 A | 9/2009 |
| JP | 2018160847 A | 10/2018 |
| JP | 2018170692 A | 11/2018 |

OTHER PUBLICATIONS

ARIB STD-T71 6.2, "Broadband Mobile Access Communication System(CSMA)", Jul. 2018.

International Search Report (PCT/ISA/210) with its partial English translation, "Notification of Transmittal of the International Search Report and the Written Opinion of the International Searching Authority, or the Declaration (PCT/ISA/220)", and "Written Opinion of the International Searching Authority (PCT/ISA/237)" issued on Mar. 17, 2020, in PCT/JP2020/000815, filed on Jan. 14, 2020.

* cited by examiner

|  | ch 1 | ch 2 | ch 3 | ch 4 | ch 5 | ch 6 | ch 7 | ch 8 | ch 9 | ... | ch15 | ch16 |
|---|---|---|---|---|---|---|---|---|---|---|---|---|
| WIRELESS BASE STATION 1 | 1 | 1 | 0 | 0 | 2 | 2 | 2 | 2 | 2 | ... | 2 | 2 |
| WIRELESS TERMINAL STATION 2-1 | 2 | 2 | 2 | 2 | 1 | 0 | 0 | 0 | 2 | ... | 2 | 2 |
| WIRELESS TERMINAL STATION 2-2 | 2 | 2 | 2 | 2 | 2 | 2 | 2 | 2 | 0 | ... | 2 | 2 |
| WIRELESS BASE STATION 3 | 2 | 2 | 2 | 2 | 2 | 2 | 2 | 2 | 2 | ... | 1 | 1 |
| OVERALL RESULTS | 1 | 1 | 0 | 0 | 1 | 0 | 0 | 0 | 0 | ... | 1 | 1 |

0: CARRIER UNDETECTED (VACANT CHANNEL)
1: CARRIER DETECTED (USED CHANNEL)
2: CARRIER SENSING UNPERFORMED

Fig. 3

WIRELESS COMMUNICATION DEVICE AND WIRELESS COMMUNICATION CONTROL METHOD

TECHNICAL FIELD

The present invention relates to a wireless communication device and a wireless communication control method for detecting channels available for wireless communication.

BACKGROUND ART

In recent years, with rapid popularization of wireless terminals including smartphones and tablets, the amount of traffic on wireless networks has drastically increased. In order to accommodate wireless traffic easily at low cost, wireless LANs are widely used as a high-speed wireless access system that uses radio waves of a band that does not require a wireless system license (Non Patent Literature 1). Wireless LANs are provided in various areas, such as private areas including homes and offices, public areas including shops, stations, airports, and the like.

In order to establish wireless communication in a wireless LAN, a frequency resource called a channel is necessary. Typically, a plurality of channels is provided in order to avoid crosstalk in the channel, and a wireless station of the wireless LAN temporarily uses one of the channels when performing communication and releases the channel when the communication ends. In the wireless LAN, the use of channels is operated autonomously in a distributed manner, and thus a wireless station in an attempt to perform communication needs to check vacant statuses of the channels spontaneously before emitting radio waves. This is referred to as a listen-before-talk (LBT) mechanism, and "carrier sensing" is performed to verify if there is no carrier in the channel to be used (channel vacant status).

CITATION LIST

Non Patent Literature

Non Patent Literature 1: IEEE Std802.11-2016, December 2016.

Non Patent Literature 2: ARM STD-T71 version 6.1, "Broadband Mobile Access Communication System (CSMA)," March 2014.

SUMMARY OF THE INVENTION

Technical Problem

The wireless station provided with the LBT mechanism performs carrier sensing to verify the vacant status of the channel to be used by the wireless station before emitting radio waves, in order to avoid collision of the transmission signal with nearby wireless stations. Further, in recent years, techniques for simultaneously using a plurality of channels have been implemented for the purpose of high-capacity transmission. Furthermore, if channels that can be used simultaneously are expanded in the future, it is necessary to instantly know the vacant status of each channel.

However, as described in Non Patent Literature 2, there is a limitation in the range of channels (frequency band) that can be sensed by one wireless station. For example, when 16 channels are available at 20 MHz per channel, the sensing range for one wireless station is specific two channels, 40 MHz or specific four channels, 80 MHz, or the like. Thus, as illustrated in FIG. 8, if vacant channels of only two channels, 40 MHz is detectable within the four channels, 80 MHz sensing range, high capacity transmission by four channels, 80 MHz cannot be performed even if there are vacant channels of four channels, 80 MHz outside the sensing range. Therefore, in order to achieve high capacity transmission, establishing a method for performing carrier sensing of a wide range at high speed by a wireless station is an objective.

Further, only two states of presence or absence of a carrier can be detected in the carrier sensing of every channel, and transmission is stopped if the carrier is detected on the channel. However, even if the carrier is detected, there may be a direction in which the carrier is spatially undetected. For example, as illustrated in FIG. 9, when the wireless station performs the carrier sensing on channels located in separate directions, direction 1 to direction 4 as viewed from the wireless station, if the carrier is detected in directions 1, 3, and 4, and no carrier is detected in direction 2, transmission is possible with respect to direction 2. In this manner, it is an objective to detect a vacant space of channel that cannot be detected by related-art techniques, and to raise the number of available channels.

An object of the present invention is to provide a wireless communication device and a wireless communication control method capable of grasping use statuses of a plurality of channels to search for available vacant channels, and enabling a search for spatially vacant channels to increase spectral efficiency.

Means for Solving the Problem

According to the invention of a first aspect, a wireless communication device that detects a vacant channel by carrier sensing from among a plurality of channels and performs communication using the vacant channel includes a carrier sensing unit configured to divide channels to be carrier sensed between a wireless station and a surrounding wireless station, acquire a result of carrier sensing from the surrounding wireless station, and share results of carrier sensing from the wireless station and the surrounding wireless station to detect the vacant channel.

In the wireless communication device according to the invention of the first aspect, the carrier sensing unit is configured to, before starting communication, transmit a trigger signal including channel information of the channels to be carrier sensed to the surrounding wireless station and receive a notification signal including a result of carrier sensing on a channel executed based on the trigger signal from the surrounding wireless station to acquire a result of carrier sensing in the surrounding wireless station.

In the wireless communication device according to the invention of the first aspect, the carrier sensing unit is configured to transmit and receive, as a notification signal that is periodic, a result of carrier sensing periodically executed by the wireless station and the surrounding wireless station to acquire a result of the carrier sensing in the surrounding wireless station from the notification signal.

In the wireless communication device according to the invention of the first aspect, the carrier sensing unit is configured to control antenna directivity of the wireless station to perform carrier sensing for respective directions, select the surrounding wireless station in each of the directions, and share a result of carrier sensing of the wireless station and the surrounding wireless station for each of the directions.

According to the invention of a second aspect, a wireless communication control method for detecting a vacant channel by carrier sensing from among a plurality of channels and performing communication using the vacant channel includes processing of dividing channels to be carrier sensed between a wireless station and a surrounding wireless station, acquiring a result of carrier sensing from the surrounding wireless station, and sharing results of carrier sensing from the wireless station and the surrounding wireless station to detect the vacant channel.

In the wireless communication control method according to the invention of the second aspect, the processing includes, before starting communication, transmitting a trigger signal including channel information of the channels to be carrier sensed to the surrounding wireless station and receiving a notification signal including a result of carrier sensing on a channel executed based on the trigger signal from the surrounding wireless station to acquire a result of carrier sensing in the surrounding wireless station.

In the wireless communication control method according to the invention of the second aspect, the processing includes transmitting and receiving, as a notification signal that is periodic, a result of carrier sensing periodically executed by the wireless station and the surrounding wireless station to acquire a result of carrier sensing in the surrounding wireless station from the notification signal.

In the wireless communication control method according to the invention of the second aspect, the processing includes controlling antenna directivity of the wireless station to perform carrier sensing for respective directions, selecting the surrounding wireless station in each of the directions, and sharing results of carrier sensing of the wireless station and the surrounding wireless station for each of the directions.

Effects of the Invention

According to the present invention, by wireless stations performing carrier sensing in cooperation and sharing results of the carrier sensing, it is possible to quickly grasp the statuses of vacant channels outside a sensing range of a wireless station. Further, by sensing channels for each of directions, it is possible to detect a vacant space which cannot be detected hitherto and increase the number of available vacant channels.

BRIEF DESCRIPTION OF DRAWINGS

FIG. 3 is a diagram illustrating results of the on-demand type cooperative carrier sensing.

DESCRIPTION OF EMBODIMENTS

First Embodiment

Figure 1:
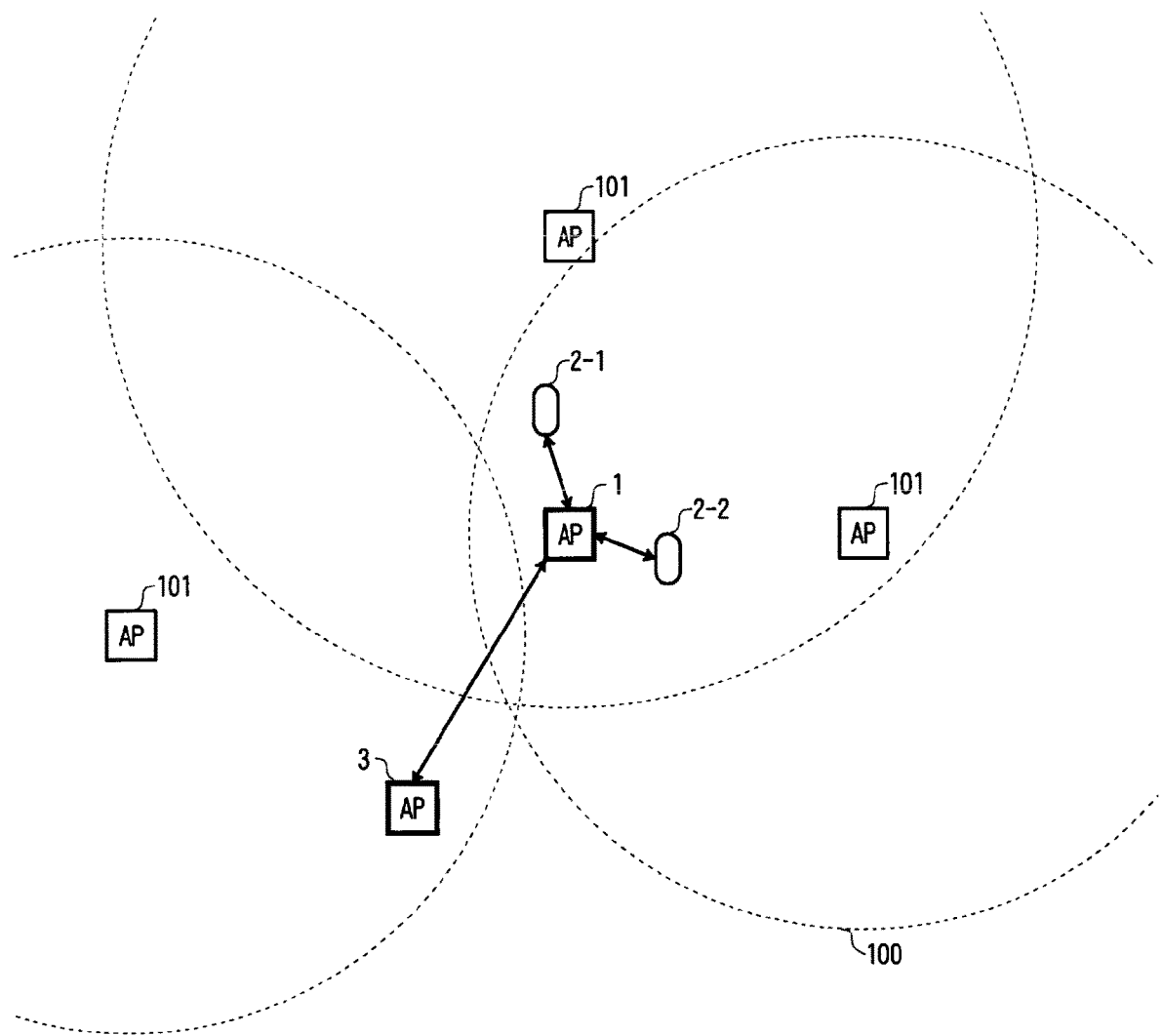
FIG. 1 is a diagram illustrating an outline of a first embodiment of the present invention.

FIG. 1 illustrates an outline of a first embodiment of the present invention.

In FIG. 1, there are a wireless base station (AP) 1 to be controlled and one or more (here, two) wireless terminal stations 2-1, 2-2 subordinate to the wireless base station 1. Furthermore, there is one wireless base station (AP) 3 or more (here, one) that share results of carrier sensing with the wireless base stations 1. Furthermore, it is an environment in which signals from adjacent wireless base stations 101 interfere in communication between the wireless base station 1 and the wireless terminal stations 2-1, 2-2. Note that while the wireless base stations 101 are provided as an example of a target that generates interference, the target may be a wireless terminal station or a wireless station of another system. Further, the range of arrival of the interference signal from each of the wireless base stations 101 is indicated by a dotted circle 100.

In normal carrier sensing operation, when the wireless base station 1 that attempts to initiate transmission performs carrier sensing for a specific channel and the channel is determined to be a vacant channel, the wireless base station 1 performs transmission to the wireless terminal stations 2-1, 2-2.

The first embodiment includes a procedure in which, before attempting to start communication, the wireless base station 1 performs carrier sensing in cooperation with the subordinate wireless terminal stations 2-1, 2-2 and the other wireless base station 3 and collects the results of the carrier sensing to grasp and secure as many channel conditions as possible to perform communication, and this procedure is referred to as "on-demand type".

Figure 2:
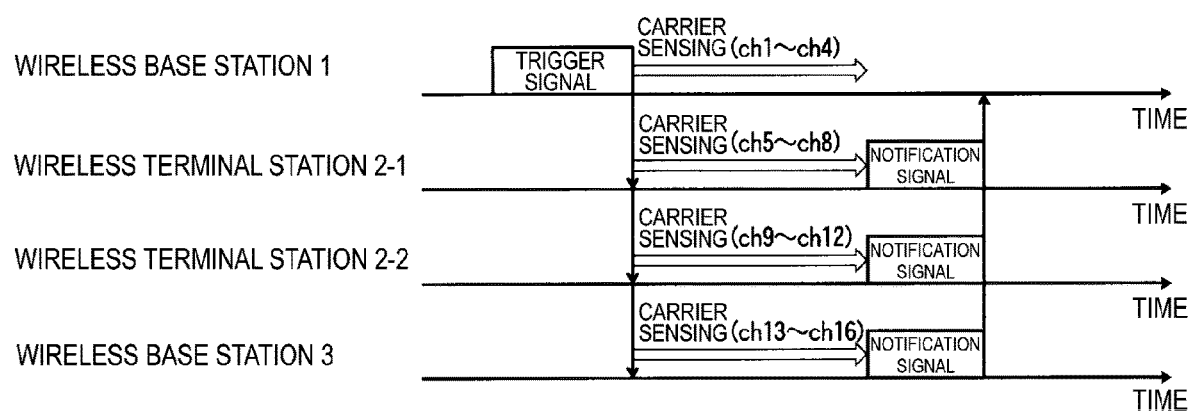
FIG. 2 is a diagram illustrating an on-demand type cooperative carrier sensing procedure.

FIG. 2 illustrates an on-demand type cooperative carrier sensing procedure.

In FIG. 2, it is assumed that the wireless base stations 1, 3 and the wireless terminal stations 2-1, 2-2 have the relationship illustrated in FIG. 1. The wireless base station 1, which desires to grasp the channel condition before starting transmission, transmits a trigger signal including addresses of the wireless terminal stations 2-1, 2-2 and the wireless base station 3 and channel ranges of carrier sensing, and also the wireless base station 1 carries out carrier sensing of a specified channel. The wireless terminal stations 2-1, 2-2 and the wireless base station 3 that have received the trigger signal immediately perform the carrier sensing with respect to the specified channel. Each station having finished the carrier sensing transmits a result of carrier sensing as a notification signal to the wireless base station 1 at once. Alternatively, in a case where the order of transmission of the notification signal is specified in the trigger signal, the notification signal is transmitted sequentially in accordance with the transmission order. The notification signal includes information on a vacant channel by the carrier sensing of the wireless terminal stations 2-1, 2-2 and the wireless base station 3. The wireless base station 1 that has received the notification signal updates the states of all the channels capable of communicating based on the result of carrier sensing of the wireless base station 1 and the results of carrier sensing of the wireless terminal stations 2-1, 2-2 and the wireless base station 3. An example of this is illustrated in FIG. 3.

In the example illustrated in FIG. 3, among the channels ch 1 to ch 16 used, it is assumed that the wireless base station 1 performs carrier sensing from ch 1 to ch 4, the wireless terminal station 2-1 performs carrier sensing from ch 5 to ch 8, the wireless terminal station 2-2 performs carrier sensing from ch 9 to ch 12, and the wireless base station 3 performs carrier sensing from ch 13 to ch 16. Here, it is assumed that each set of the channels to be carrier sensed is four channels, but the channels do not necessarily have to be continuous channels. Further, as the results of the carrier sensing of the wireless base stations 1, 3 and the wireless terminal stations 2-1, 2-2, carrier undetected (vacant channel) is denoted as "0", carrier detected (used channel) is denoted by "1", and carrier sensing unperformed is denoted by "2". In the wireless base station 1, when the results of carrier sensing of the respective stations are taken together, ch 3, ch 4, ch 6 and the like are detected as vacant channels.

Note that in the arrangement illustrated in FIG. 1, a carrier that cannot be detected by the wireless base station 1 can be detected by the wireless terminal stations 2-1, 2-2 or the wireless base station 3, by which the problem of hidden terminal can be eliminated in some cases.

Further, although it has been assumed that the trigger signal transmitted by the wireless base station 1 includes information that specifies a channel to be carrier sensed to the wireless terminal stations 2-1, 2-2 and the wireless base station 3, the wireless terminal station 2-1, 2-2 and the wireless base stations 3 may perform the carrier sensing on a randomly selected channel other than the channel to be carrier sensed by the wireless base station 1 that has transmitted the trigger signal.

Further, although it has been assumed that the notification signal can store vacant statuses for a plurality of channels, an acknowledgement signal (ACK) may be used instead of the notification signal when it is only required to store a vacant status of only one channel, and any station that does not return the acknowledgement signal as seen from the wireless base station 1 side may be treated as having no vacant channel.

Further, when the wireless base station 1 specifies the channel ranges of the carrier sensing of the wireless terminal stations 2-1, 2-2 and the wireless base station 3, a channel that is likely to be a vacant channel may be preferentially specified from statistical information that has been acquired.

Figure 4:
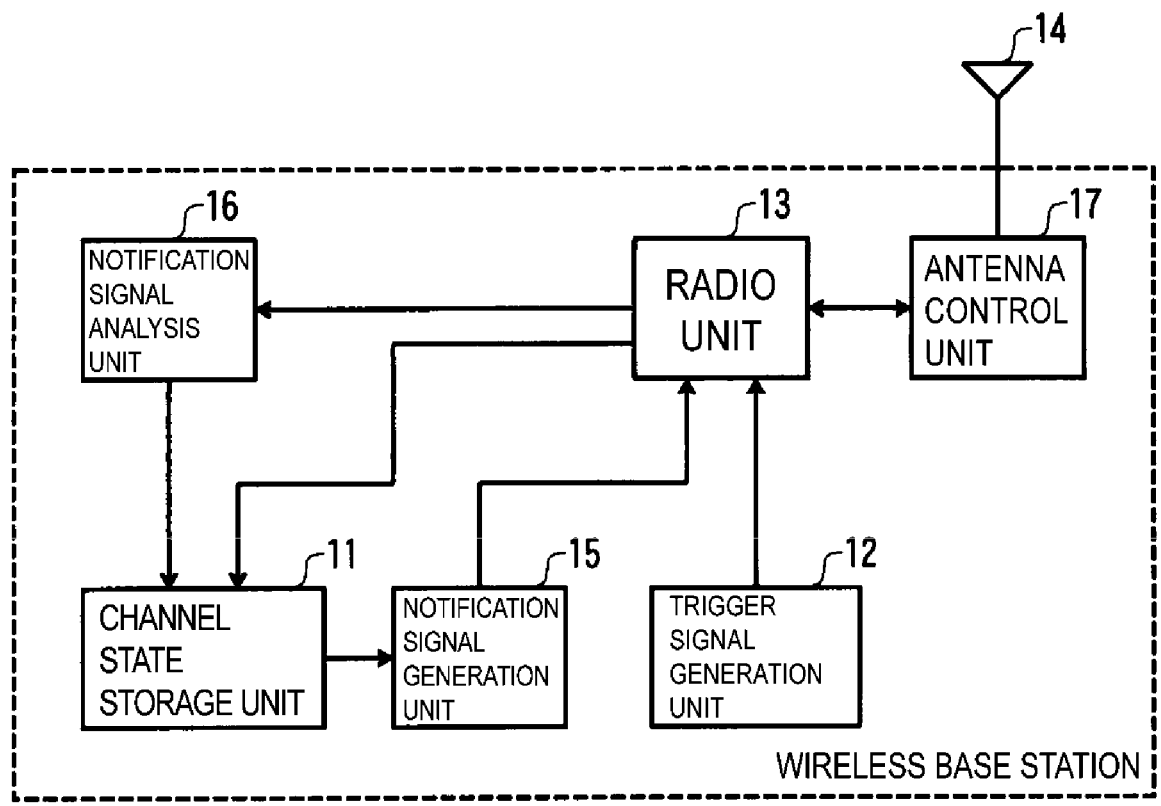
FIG. 4 is a diagram illustrating a configuration example of a wireless base station 1 in the first embodiment.

FIG. 4 illustrates a configuration example of the wireless base station 1 in the first embodiment.

In FIG. 4, the wireless base station 1 includes a channel state storage unit 11, a trigger signal generation unit 12, a radio unit 13, an antenna unit 14, a notification signal generation unit 15, a notification signal analysis unit 16, and an antenna control unit 17. The wireless base station 3 has a similar configuration. Note that only blocks related to the first embodiment are described here, and blocks that are commonly used are omitted.

The channel state storage unit 11 stores a result of carrier sensing that is input from the radio unit 13 or the notification signal analysis unit 16 and outputs the result to the notification signal generation unit 15. Note that the notification signal generation unit 15 functions in the wireless base station 3 in cooperation with the wireless base station 1.

The trigger signal generation unit 12 invokes a wireless terminal station 2 and the wireless base station 3 in cooperation, generates a trigger signal including channel information for the carrier sensing to be performed by the wireless terminal station 2 and the wireless base station 3 and outputs the generated signal to the radio unit 13.

The radio unit 13 outputs the results of carrier sensing of channels, which are measured by the wireless base stations 1, 3, from a radio signal input from the antenna control unit 17 to the channel state storage unit 11. Further, the radio unit 13 extracts the notification signals from the wireless terminal station 2 and the wireless base station 3 input from the antenna control unit 17 and outputs the extracted notification signals to the notification signal analysis unit 16. Furthermore, the radio unit 13 converts signals input from the notification signal generation unit 15 and the trigger signal generation unit 12 to wireless LAN signals and outputs the signals to the antenna control unit 17.

The antenna unit 14 receives radio waves from the air and inputs the radio waves to the antenna control unit 17. Further, the antenna unit 14 emits the radio signal input from the antenna control unit 17 into the air.

The notification signal generation unit 15 that functions in the wireless base station 3 generates a notification signal according to all or a part of vacant channels from the result of carrier sensing that is input from the channel state storage unit 11 and outputs the generated signal to the radio unit 13.

The notification signal analysis unit 16 extracts result information of carrier sensing acquired by each station from the notification signals from the wireless terminal station 2 and the wireless base station 3 input from the radio unit 13 and outputs the result information to the channel state storage unit 11.

The antenna control unit 17 controls directivity of the antenna unit 14 so as to emit a radio signal input from the radio unit 13 in a specified direction and outputs the radio signal to the antenna unit 14 for use in carrier sensing in each of directions, which will be described in a third embodiment described below. Further, the antenna control unit 17 outputs the direction of arrival of the radio signal input from the antenna unit 14 to the radio unit 13 together with the radio signal.

Figure 5:
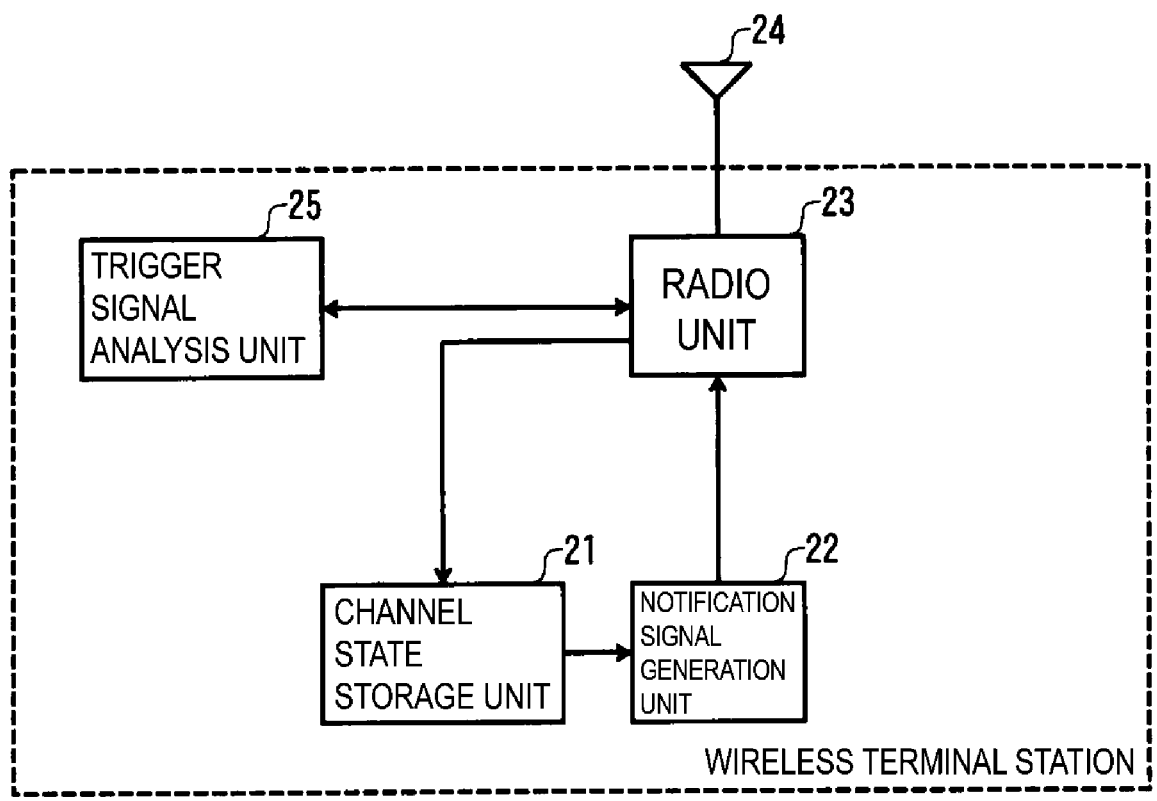
FIG. 5 is a diagram illustrating a configuration example of a wireless terminal station 2 in the first embodiment.

FIG. 5 illustrates a configuration example of the wireless terminal station 2 in the first embodiment.

In FIG. 5, the wireless terminal station 2 includes a channel state storage unit 21, a notification signal generation unit 22, a radio unit 23, an antenna unit 24, and a trigger signal analysis unit 25. Note that only blocks related to the first embodiment are described here, and blocks that are commonly used are omitted.

The channel state storage unit 21 stores a result of carrier sensing that is input from the radio unit 23 as illustrated in FIG. 3 and outputs the result to the notification signal generation unit 22.

The notification signal generation unit 22 generates a notification signal according to all or a part of vacant channels from the result of carrier sensing that is input from the channel state storage unit 21 and outputs the generated signal to the radio unit 23.

The radio unit 23 extracts a trigger signal from the wireless base station 1 that is input from the antenna unit 24 and outputs the extracted trigger signal to the trigger signal analysis unit 25. Further, the radio unit 23 performs carrier sensing according to channel information of carrier sensing that is input from the trigger signal analysis unit 25 and outputs the result of carrier sensing to the channel state storage unit 21. Furthermore, the radio unit 23 converts the notification signal input from the notification signal generation unit 22 into a wireless LAN signal and outputs the converted wireless LAN signal to the antenna unit 24.

The antenna unit 24 receives radio waves from the air and inputs the radio waves to the radio unit 23. Further, the antenna unit 24 emits a radio signal that is input from the radio unit 23 into the air.

The trigger signal analysis unit 25 extracts channel information of carrier sensing from the trigger signal that is input from the radio unit 23 and outputs a result of the extraction to the radio unit 23.

Second Embodiment

A second embodiment includes a procedure in which, in the environment of the first embodiment illustrated in FIG. 1, the wireless base station 1 periodically shares carrier sensing information with another wireless base station 3 to grasp and secure as many channel conditions as possible so as to perform communication, and this procedure is referred to as "beacon type". Note that there may be a plurality of other wireless base stations 3 that share carrier sensing information with the wireless base station 1.

Figure 6:
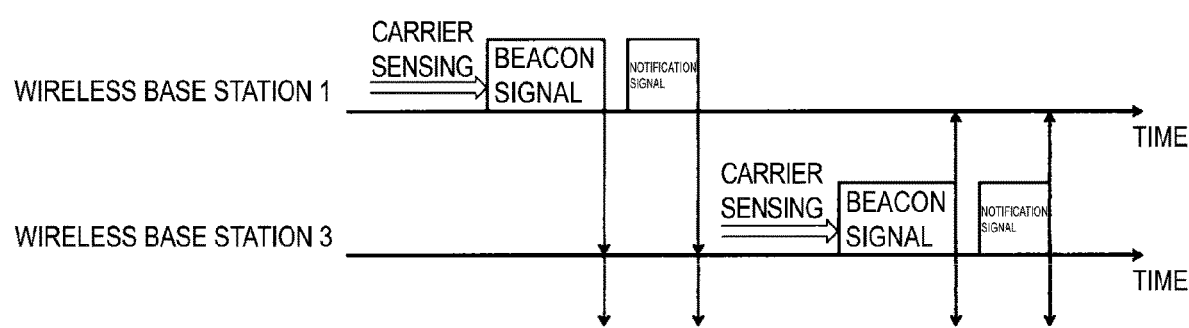
FIG. 6 is a diagram illustrating a beacon type cooperative carrier sensing procedure.

FIG. 6 illustrates a beacon type cooperative carrier sensing procedure.

In FIG. 6, each of the wireless base stations 1 and 3 performs carrier sensing before transmitting a beacon signal, generates a notification signal including a result of the carrier sensing, and broadcasts the notification signal following the beacon signal. The wireless base stations 1 and 3 acquire the carrier sensing result of another wireless base station based on information of the notification signal that follows the beacon signal.

Note that although it has been assumed that the wireless base stations 1 and 3 broadcast the notification signal immediately after transmitting the beacon signal, the wireless base stations 1 and 3 may transmit the notification signal at any time. Further, the wireless terminal stations 2-1, 2-2 may intercept the notification signal in the second embodiment and may divert information of the notification signal to the notification signal in the first embodiment.

Figure 7:
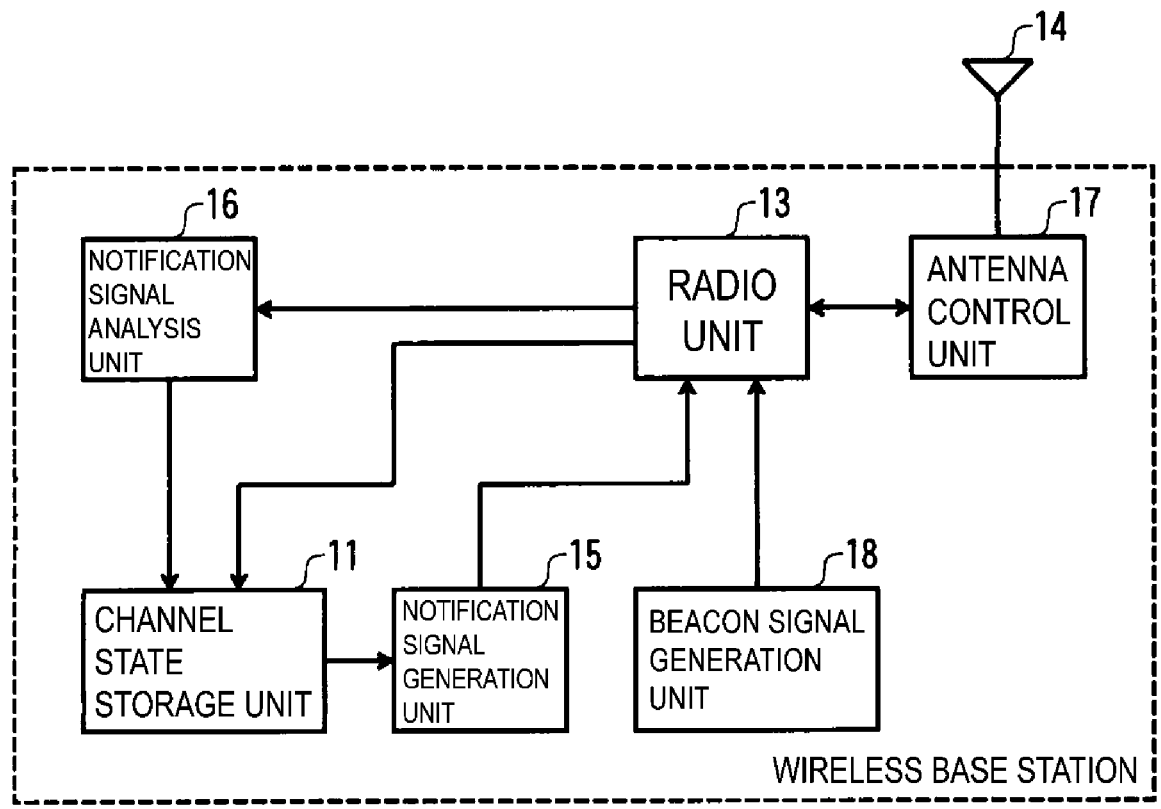
FIG. 7 is a diagram illustrating a configuration example of a wireless base station 1 in a second embodiment.
Figure 8:
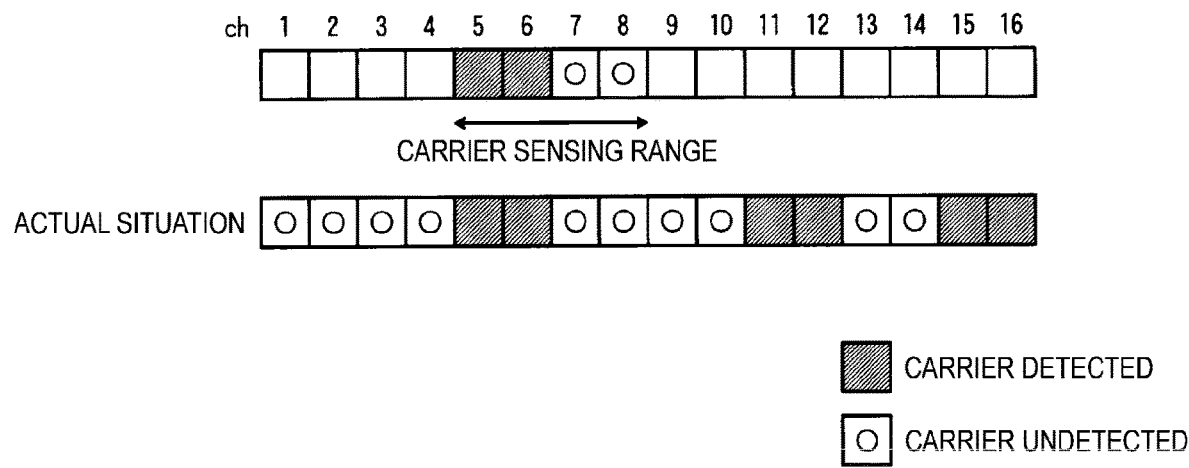
FIG. 8 is a diagram for explaining a problem of a related-art carrier sensing.

FIG. 7 illustrates a configuration example of the wireless base station 1 in the second embodiment.

In FIG. 7, the wireless base station 1 of the second embodiment includes a beacon signal generation unit 18 instead of the trigger signal generation unit 12 of the wireless base station 1 of the first embodiment illustrated in FIG. 4, and the other is the same and thus the description is omitted. The wireless base station 3 has a similar configuration.

The beacon signal generation unit 18 generates information necessary for the subordinate wireless terminal stations 2-1, 2-2 to connect to the wireless base station 1 at a constant period, such as a channel used by the wireless base station 1 and outputs the information as a beacon signal to the radio unit 13. The notification signal generation unit 15 generates a notification signal including the result of carrier sensing and outputs the generated notification signal to the radio unit 13. The radio unit 13 that has received the beacon signal or the notification signal converts the beacon signal or the notification signal into a wireless LAN signal and outputs the converted wireless LAN signal to the antenna control unit 17.

Third Embodiment

In a third embodiment, the wireless base station 1 grasps the position of a wireless base station 101 or the like, which is an interference source, in each of directions and performs carrier sensing in each of the directions with respect to the channel to be used for communication with the wireless terminal stations 2-1, 2-2. Then, each wireless base station sharing carrier sensing information may then share the result of carrier sensing in each of the direction between wireless base stations whose positional relationship is known using, for example, the beacon type cooperative carrier sensing procedure illustrated in the second embodiment.

Figure 9:
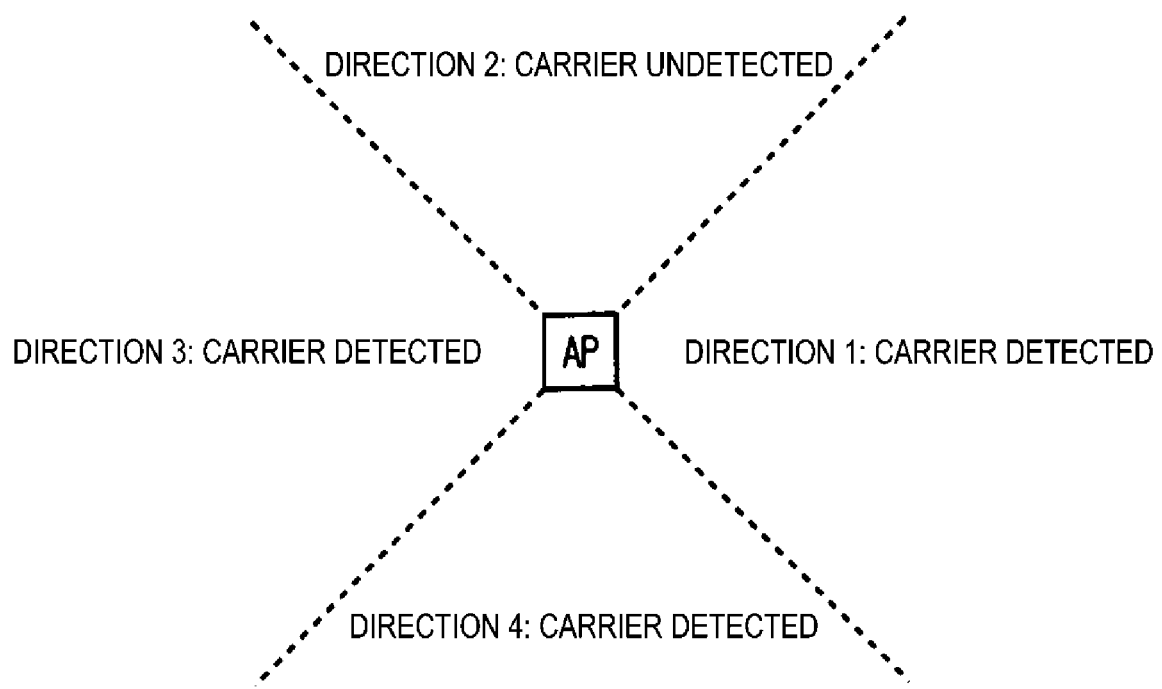
FIG. 9 is a diagram for explaining a problem of a related-art carrier sensing.

The channel state storage unit 11 of the first embodiment illustrated in FIG. 4 and the second embodiment illustrated in FIG. 7 stores results of the carrier sensing for each of directions as illustrated in FIG. 9, for example, in addition to the result of carrier sensing of the wireless base station 1, in which the channel state storage unit 11 is included. The antenna control unit 17 controls directivity of the antenna unit 14 so as to emit a radio signal input from the radio unit 13 in a specified direction and outputs the radio signal to the antenna unit 14.

When the wireless base station 1 performs communication, the radio unit 13 refers to the channel state storage unit 11 and secures one or more channels with the longest continuous vacant channel state for every direction. The wireless base station 1 may perform carrier sensing on any direction and channel and update the channel state storage unit 11, without performing communications in a case where all of the channel state storage units 11 are in a full state. Note that in a case where the wireless base station 1 can use discontinuous channels at the same time, all vacant state channels of the channel state storage unit 11 can be secured and used for communication regardless of whether the vacant state channels are continuous or discontinuous. Further, in a case where the direction of the wireless terminal station 2, which is the communication partner of the wireless base station 1 is known, the wireless base station 1 may secure the channel with reference to information of the channel state storage unit 11 in the direction closest to the direction in which the wireless terminal station 2 is located, and perform communication with directivity being directed to the wireless terminal station 2.

REFERENCE SIGNS LIST

1, 3 Wireless base station
2 Wireless terminal station
11 Channel state storage unit
12 Trigger signal generation unit
13 Radio unit
14 Antenna unit
15 Notification signal generation unit
16 Notification signal analysis unit
17 Antenna control unit
18 Beacon signal generation unit
21 Channel state storage unit
22 Notification signal generation unit
23 Radio unit
24 Antenna unit
25 Trigger signal analysis unit

The invention claimed is:

1. A wireless communication device that detects a vacant channel by carrier sensing from among a plurality of channels and performs communication using the vacant channel, the wireless communication device comprising
 a carrier sensing circuitry configured to divide channels to be carrier sensed between the wireless communication device and a surrounding wireless station, such that a portion of said plurality of channels is carrier sensed by said wireless communication device and the rest of said plurality of channels is carrier sensed by said surrounding wireless station, before starting data transmission, transmit a trigger signal specifying a subset of the plurality of channels to be carrier sensed to the surrounding wireless station, acquire a result of carrier sensing performed by the surrounding wireless station in response to the trigger signal, and detects the vacant channel based on the results of carrier sensing by the wireless communication device station and the surrounding wireless station, where the result of carrier sensing from the surrounding wireless station indicates a channel status for each channel in the subset of channels and the subset of channels includes two or more channels.

2. The wireless communication device according to claim 1, wherein the carrier sensing circuitry is configured to, before starting data transmission, receive a notification signal including the result of carrier sensing on a channel executed based on the trigger signal from the surrounding wireless station to acquire the result of carrier sensing in the surrounding wireless station.

3. The wireless communication device according to claim 1, wherein the carrier sensing circuitry is configured to transmit and receive, as a notification signal that is periodic, the result of carrier sensing periodically executed by the wireless communciation device and the surrounding wireless station to acquire a result of carrier sensing in the surrounding wireless station from the notification signal.

4. The wireless communication device according to claim 1, wherein the carrier sensing circuitry is configured to control antenna directivity of the wireless communciation device to perform carrier sensing for respective directions, select the surrounding wireless station in each of the directions, and share a result of carrier sensing of the wireless communciation device and the surrounding wireless station for each of the directions.

5. A wireless communication control method for detecting a vacant channel by carrier sensing from among a plurality of channels and performing communication using the vacant channel, the method comprising dividing channels to be carrier sensed between a wireless station and a surrounding wireless station, such that a portion of said plurality of channels is carrier sensed by said wireless station and the rest of said plurality of channels is carrier sensed by said surrounding wireless station, before starting data transmission, transmit a first trigger signal specifying a subset of the plurality of channels to be carrier sensed to the wireless station and transmit a second trigger signal specifying another subset of channels to be carrier sensed to the surrounding wireless station, where the channels in the subset of channels differ from the channel in the another subset of channels, acquiring a result of carrier sensing performed by the wireless station in response to the first trigger signal, acquiring a result of carrier sensing performed by the surrounding wireless station in response to the second trigger signal, and detecting the vacant channel based on the results of carrier sensing from the wireless station and the surrounding wireless station, where the result of carrier sensing from the wireless station indicates a channel status for each channel in the subset of channels and the result of carrier sensing from the surrounding wireless station indicates a channel status for each channel in the another subset of channels.

6. The wireless communication control method according to claim 5, wherein said acquiring a result of carrier sensing includes receiving a notification signal including the result of carrier sensing on a channel executed based on the trigger signal from the surrounding wireless station to acquire the result of carrier sensing in the surrounding wireless station.

7. The wireless communication control method according to claim 5, wherein said acquiring a result of carrier sensing includes transmitting and receiving, as a notification signal that is periodic, a result of carrier sensing periodically executed by the wireless station and the surrounding wireless station to acquire a result of carrier sensing in the surrounding wireless station from the notification signal.

8. The wireless communication control method according to claim 5, wherein said acquiring a result of carrier sensing includes controlling antenna directivity of the wireless station to perform carrier sensing for respective directions, selecting the surrounding wireless station in each of the directions, and sharing results of carrier sensing of the wireless station and the surrounding wireless station for each of the directions.

* * * * *